(12) United States Patent
Sen (10) Patent No.: US 8,904,290 B2
(45) Date of Patent: Dec. 2, 2014

(54) NON-HIERARCHICAL MULTI-HASH TABLE MODEL FOR MENU DATA REPRESENTATION

(75) Inventor: Ananya Sen, Fremont, CA (US)

(73) Assignee: Motorola Mobility LLC, Libertyville, IL (US)

( * ) Notice: Subject to any disclaimer, the term of this patent is extended or adjusted under 35 U.S.C. 154(b) by 399 days.

(21) Appl. No.: 13/533,190

(22) Filed: Jun. 26, 2012

(65) Prior Publication Data

US 2013/0346846 A1    Dec. 26, 2013

(51) Int. Cl.
*G06F 17/24*    (2006.01)

(52) U.S. Cl.
CPC .............. *G06F 17/245* (2013.01); *G06F 17/24* (2013.01)
USPC ............ 715/743; 715/227; 715/733; 715/741

(58) Field of Classification Search
CPC . G06F 3/0481; G06F 3/04886; G06F 9/4443; G06F 17/24; G06F 17/245; G06F 21/31; G06F 21/36; G06Q 10/10; H04L 29/06; H04L 29/08072
USPC .................................. 715/227, 733, 741, 743
See application file for complete search history.

(56) References Cited

U.S. PATENT DOCUMENTS

| | | | |
|---|---|---|---|
| 5,600,554 A * | 2/1997 | Williams ....................... | 705/320 |
| 6,865,268 B1 * | 3/2005 | Matthews et al. ........ | 379/265.09 |
| 7,058,639 B1 | 6/2006 | Chatterjee et al. | |
| 8,438,581 B2 * | 5/2013 | Liu et al. ....................... | 719/320 |
| 2002/0149623 A1 * | 10/2002 | West et al. .................... | 345/765 |
| 2004/0148372 A1 * | 7/2004 | Campbell ..................... | 709/223 |
| 2008/0154830 A1 | 6/2008 | Gschwind et al. | |

OTHER PUBLICATIONS

John Zukowski; Taming Tiger: Loading Properties from XML; Feb. 25, 2004; IBM developerWorks; pp. 1-4.*
DataTable with Dynamic Context Menu; Nov. 7, 2010; pp. 1-2.*
Mo Jave Linux, "DOM Menu Library HOWTO". Jun. 26, 2012, 3 pages, http://www.mojavelinux.com/projects/dommenu/HOWTO.html.
Java, "Build a tree and Populate it from Hashtables", Jun. 26, 2012, 4 pages, http://www.java2s.com/Code/Java/Swing-JFC/Buildatreeandpopulateitfromhashtables.htm.

* cited by examiner

*Primary Examiner* — Andrew Dyer
(74) *Attorney, Agent, or Firm* — Ropes & Gray LLP (57) ABSTRACT

A method for supporting versions of a menu includes identifying menu items for an application. The menu items are in a first menu and have state data used by functions to perform operations. The method includes generating indices from the menu items, generating a first table that includes the indices and the functions, and generating a second table that includes a portion of the indices. The indices in the first table correspond to the functions, the portion defines a subset of menu items for a second menu, and the portion of the indices corresponds to a portion of the state data. When an operation is to be performed, an index for the subset of menu items is used to determine state data corresponding to the index in the second table, and the index is used to determine a function corresponding to the index in the first table.

11 Claims, 6 Drawing Sheets

NON-HIERARCHICAL MULTI-HASH TABLE MODEL FOR MENU DATA REPRESENTATION

BACKGROUND

Applications operable on computing devices include menus that provide user-selectable options for the applications. Stand-alone applications, web applications, and the like include the menus. A menu often includes a number of menu items, which are often located in a banner that is positioned across the top of a user interface for an application. Each menu item is associated with a number of sub-menu items. If a menu item is selected, the menu item's sub-menu items are displayed in the user interface in a drop-down menu. Selection of a sub-menu item may cause other sub-menu items to be displayed or may cause a function of the application to be performed. For example, a drawing application for drawing computer images on a user interface may include menu items for drawing, color, editing, view, etc. Sub-menu items for the drawing menu item might include line, square, circle, 3D, box, etc. Selection of one of the sub-menu items, such as the circle sub-menu item, causes the user interface to display a drawing pallet where the drawing pallet includes drawing options for drawing circles. The drawing pallet displays the function associated with the circle sub-menu item. Menu items and sub-menu items may also have associated state data. For example, for the circle sub-menu item, the state data includes a size of the drawing pallet, text in the drawing pallet, and an enablement state of the drawing pallet.

The application may display different sub-menu items on computing devices of different users. For example, a computing device that is using a free trial version of an application may display only a portion of the sub-menu items, whereas a computing device of a paying licensee of the application may display all of the sub-menu items available for the application. Considerations other than licensing rights of users' may also be used for controlling the sub-menu items of an application that the computing devices display.

DETAILED DESCRIPTION

Described herein are techniques for providing different sets of sub-menu items in a menu of an application to computing devices of different users.

According to one embodiment, a method for supporting versions of a menu for an application includes identifying menu items for the application. The menu items are in a first menu, and the menu items have state data being used by functions to perform operations for the menu items. The method further includes generating indices from the menu items where the indices identify the menu items. The method includes generating, by a computing device, a first table that includes the indices and the functions. The indices in the first table correspond to the functions. The method further includes generating, by the computing device, a second table that includes a portion of the indices included in the first table. The portion of the indices defines a subset of menu items for a second menu. The portion of the indices corresponds to a portion of the state data. When an operation for a menu item in the subset of menu items is to be performed, an index for the menu item in the subset of menu items is used to determine state data corresponding to the index in the second table and the index is used to determine a function corresponding to the index in the first table.

According to another embodiment, a computing device for supporting versions of a menu includes a processor for executing instructions; and a non-transitory computer-readable storage medium comprising stored instructions for controlling the processor to be operable for: identifying menu items for the application, wherein the menu items are in a first menu, and the menu items have state data being used by functions to perform operations for the menu items; generating indices from the menu items, wherein the indices identify the menu items; generating a first table that includes the indices and the functions, wherein the indices in the first table correspond to the functions; generating a second table including a portion of the indices included in the first table, the portion defining a subset of menu items for a second menu, wherein: the portion of the indices corresponds to a portion of the state data, and when an operation for a menu item in the subset of menu items is to be performed, an index for the menu item in the subset of menu items is used to determine state data corresponding to the index in the second table and the index is used to determine a function corresponding to the index in the first table.

According to one embodiment, a non-transitory computer-readable storage medium includes instructions for supporting versions of a menu, the instructions are for controlling a computer system to be operable for: identifying menu items for the application, wherein the menu items are in a first menu, and the menu items have state data being used by functions to perform operations for the menu items; generating indices from the menu items, wherein the indices identify the menu items; generating a first table that includes the indices and the functions, wherein the indices in the first table correspond to the functions; generating a second table including a portion of the indices included in the first table, the portion defining a subset of menu items for a second menu, wherein: the portion of the indices corresponds to a portion of the state data, and when an operation for a menu item in the subset of menu items is to be performed, an index for the menu item in the subset of menu items is used to determine state data corresponding to the index in the second table and the index is used to determine a function corresponding to the index in the first table.

Figure 1:
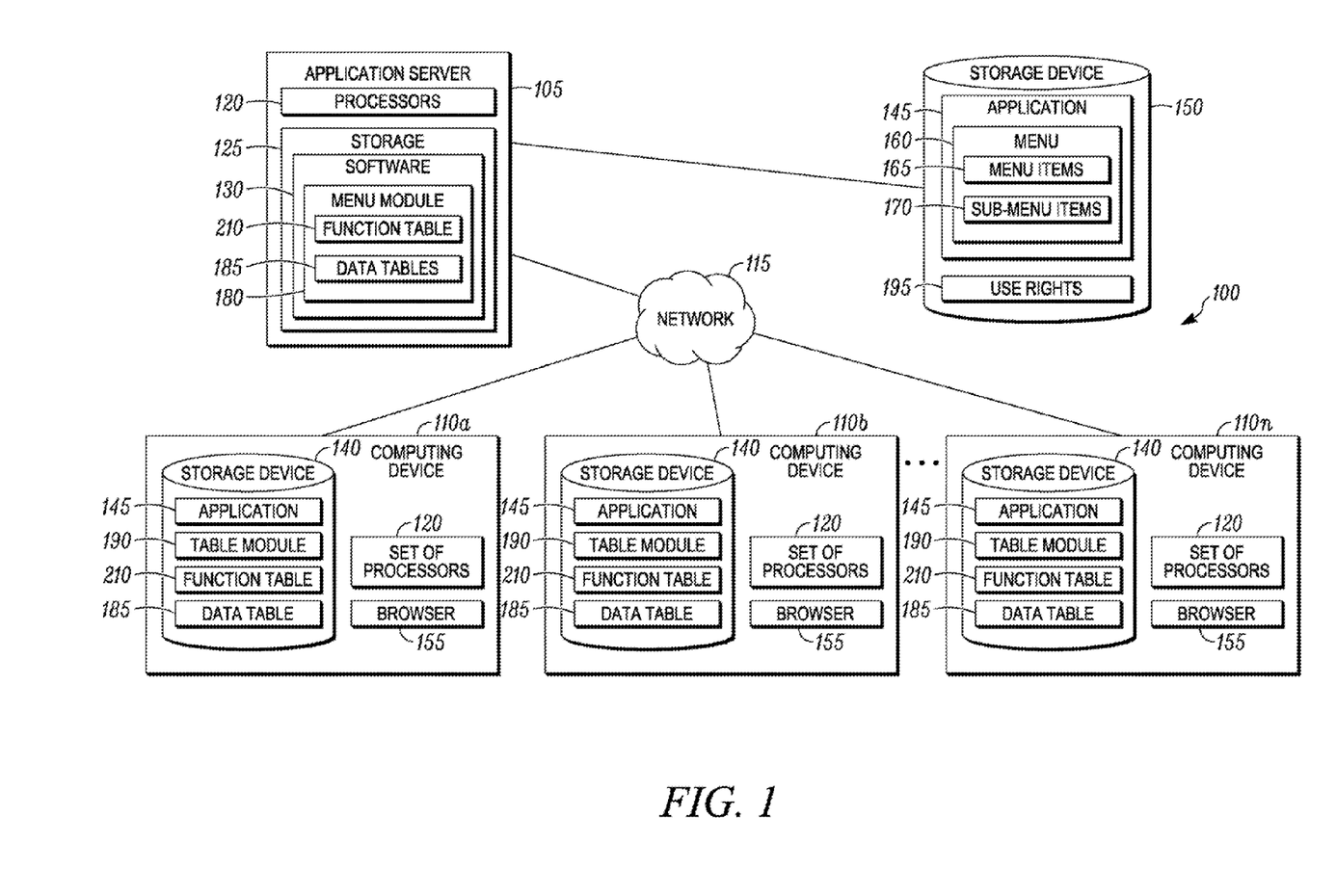
FIG. 1 depicts a computing system according to one embodiment.

FIG. 1 depicts a computing system 100 according to one embodiment. Computing system 100 includes an application server 105, computing devices 110, and a network 115. Application server 105 may be a computing device that operates a server operating system. Application server 105 may include a set of processors 120 and a storage device 125. Storage device 125 may store software 130, which may be supplied from storage device 125 to the set of processors 120 for execution. Similarly, computing devices 110 may include a set of processors 135 and a storage device 140. Storage device 140 may store copies of an application 145, which may be supplied from storage device 140 to processors 135 for execution. Storage device 140 may store other software, which may also be supplied to processors 135 for execution. Storage devices 125 and 140 may be non-transitory computer readable storage mediums. Network 115 may include a variety of networks, such as one or more intranets, the Internet, etc.

Application server 105 may access an application storage device 150 (a non-transitory computer readable medium), which stores applications 145 according to one embodiment. Also, application server 105 may provide copies of application 145 to computing devices 110*a*-110*n*. Application 145 may be a web application operable in a browser environment of a browser 155 or a standalone application that does not operate in the browser environment.

Application 145 may include a menu 160, which includes menu items 165 and sub-menu items 170. Menu items 165 and sub-menu items 170 are user selectable for controlling various functions of application 145. Each menu item 165 is associated with a portion of sub-menu items 170 and each sub-menu item 170 may be associated with further sub-menu items. Menu items 165 and sub-menu items 170 are sometimes referred to herein as "menu items" for convenience. In one embodiment, menu 160 is a tree data structure with menu items 165 at upper nodes (e.g., root nodes) of the data structure and sub-menu items 170 at lower nodes and/or leaf nodes on branches of the data structure.

Figure 2:
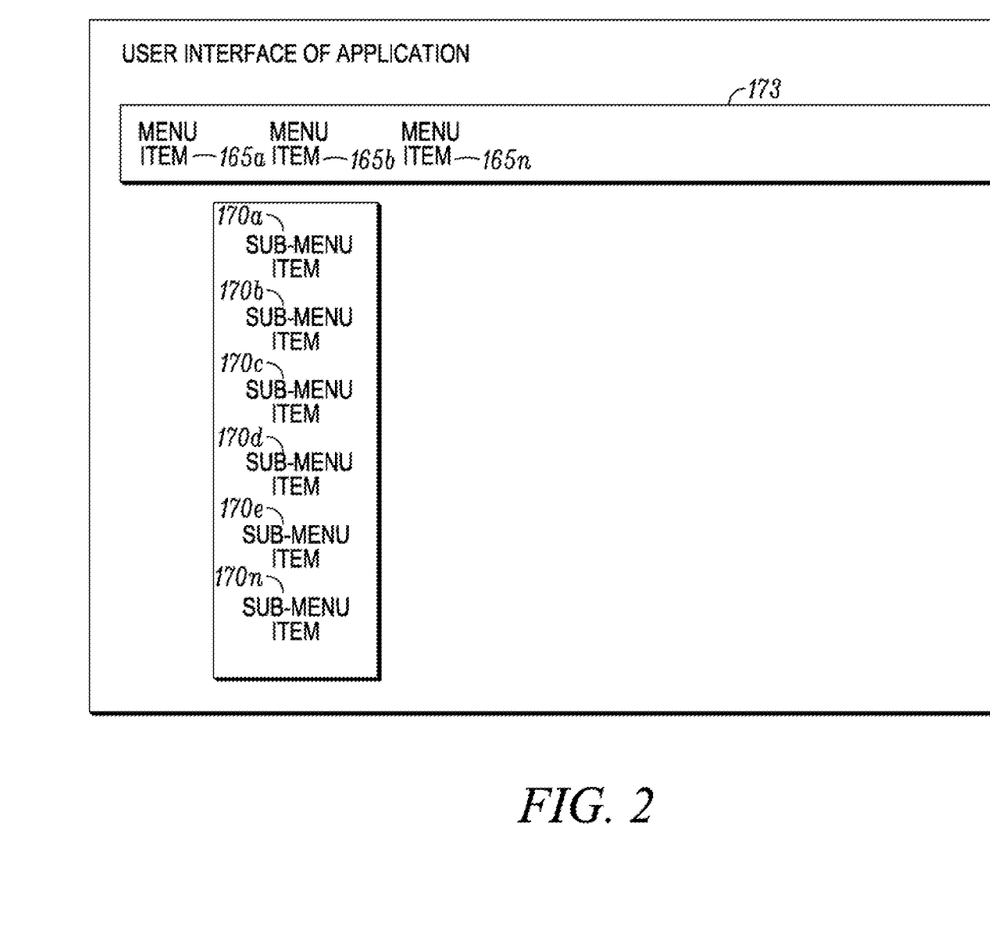
FIG. 2 depicts a portion of an example menu for an application according to one embodiment.

FIG. 2 depicts an example of menu 160 according to one embodiment. A user interface of application 145 operating on computing devices 110 may display menu 160. Menu 160 includes menu items 165 displayed in a banner 173 of the user interface of application 145 according to one embodiment. If one of menu items 165 is selected, the user interface displays a portion of sub-menu items 170 associated with the menu item. The user interface displays sub-menu items 170 in dropdown menus or the like. FIG. 2 shows a drop down menu for menu item 165*b* and the sub-menu items 170 associated with menu item 165*b*. The other menu items 165 are associated with other sub-menu items 170 according to one embodiment.

Referring back to FIG. 1, software 130 may include a menu module 180, which processes menu 160 of application 145 and provide data tables 185 respectively to computing devices 110. Each computing device 110 may use one of the data tables 185 to determine a portion of menu items 165 and a portion of sub-menu items 170 that will be available for the copy of application 145 operating on the computing device. Each computing device 110 may include a table module 190 that processes one of the data tables 185 received by the computing device to determine the portion of menu items 165, and the portion of sub-menu items 170 that will be available for application 145 operating on the computing device.

Figure 3:
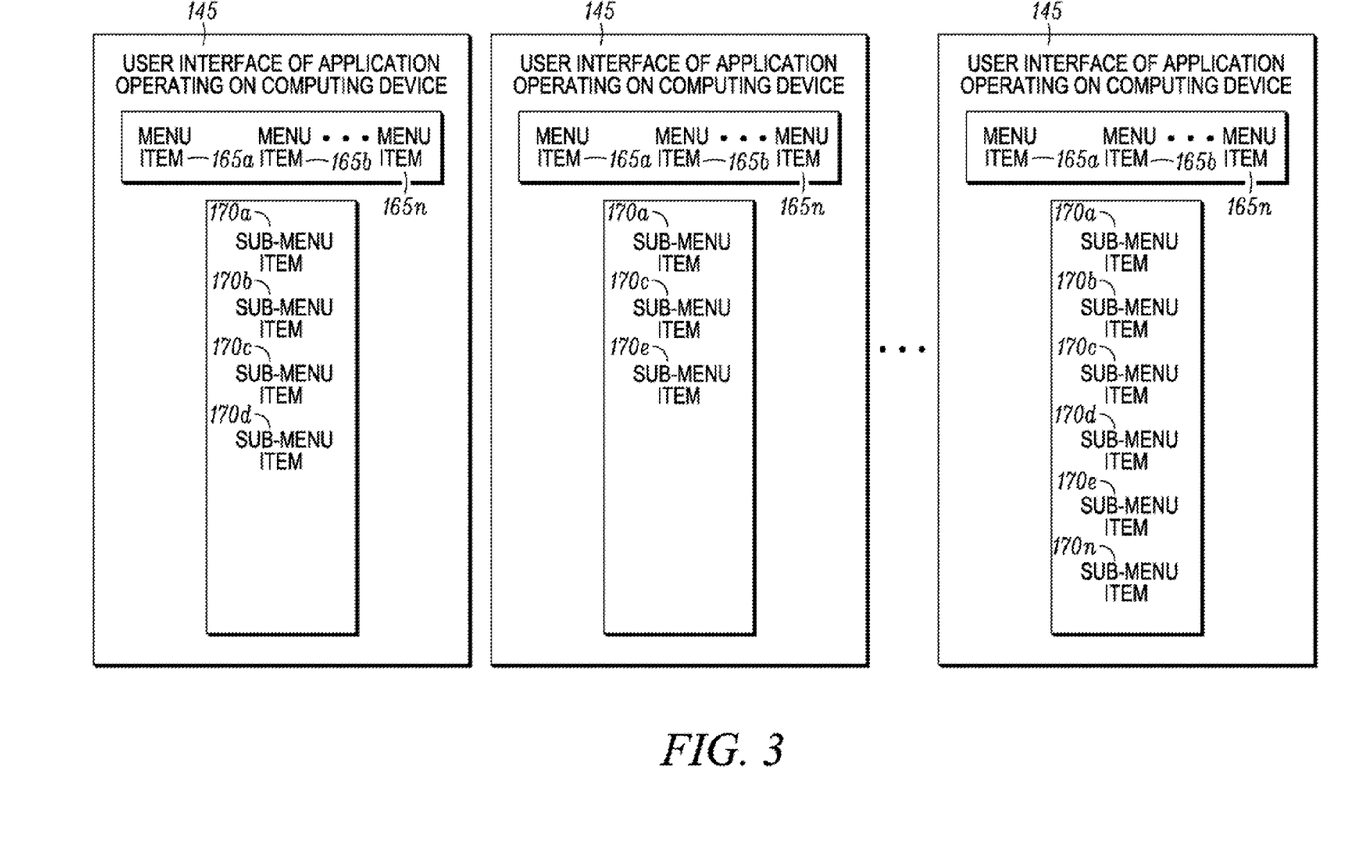
FIG. 3 depicts a number of sub-menus of the example menu of FIG. 2 available for copies of the application operating, respectively, on a number of computing devices.

FIG. 3 depicts menus 160 available for the copies of application 145 operating on computing devices 110. Each menu 160 available on computing devices 110 may include different portions of menu items 165 and/or different portions of sub-menu items 170 as shown in FIG. 3. The portions of sub-menu items 170 available for menu item 165*b* on computing devices 110 is shown in FIG. 3. The portions of sub-menu items 170 are shown as differing from each other in FIG. 3.

The portion of menu items 165 and the portion of sub-menu items 170 that are available for use by computing devices 110 may be determined based on a variety of criteria. For example, the portion of menu items 165 and the portion of sub-menu items 170 that are available for use by computing devices 110 may be determined based on use rights 195 of the users' of computing devices 110. Use rights 195 may include licensing rights of users, group affiliation of the users (e.g., management group, development group, test group, etc.), etc.

Referring back to FIG. 1, according to one embodiment, menu module 180 analyzes application 145 or documents associated with application 145 to identify menu items 165 and sub-menu items 170. If application 145 is a web-application, menu module 180 may analyze HTML code, XML code, DOM (document object model) identifiers, etc. for application 145 to identify menu items 165 and sub-menu items 170. Menu items 165 and sub-menu items 175 may be classes, DOM element identifiers, etc.

Figure 4:
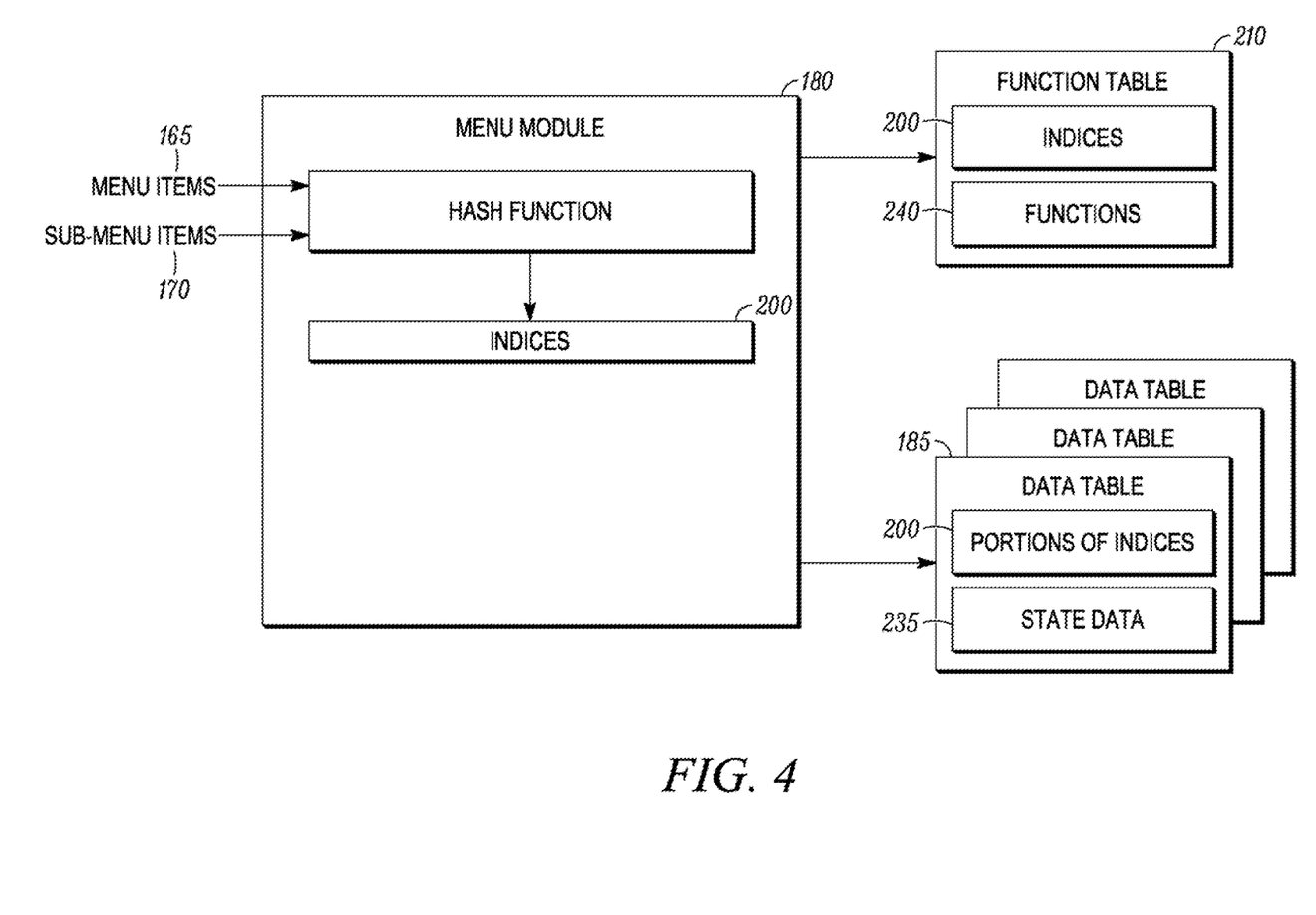
FIG. 4 depicts a menu module for processing the menu according to one embodiment.

FIG. 4 depicts an example of menu module 180 according to one embodiment. Menu module 180 may generate indices 200 for menu items 165 and sub-menu items 175 where indices 200 respectively identify menu items 165 and sub-menu items 175. Indices 200 may be hash values generated by hashing menu items 165 and sub-menu items 175. That is, menu items 165 and sub-menu items 170 may be used as keys for a hash function, which is used by menu module 180 to generate indices 200. While the foregoing describes indices 200 as hash values generated by a hash function, indices 200 may be other values generated by other functions, which are configured to generate indices.

Menu module 180 may generate a function table (e.g., a first hash table) 210, which includes indices 200. Menu module 180 may also generate the set of data tables 185 (e.g., second hash tables) where each data table 185 includes a portion of indices 200. The portions of indices 200 included in data tables 185 may overlap. Examples of portions of indices 200 overlapping in data tables 185 is described below with respect to FIG. 5. Menu items 165 and sub-menu items 175 are associated with state data 235 and with functions 240 according to one embodiment. In function table 210, indices 200 (which identify menu items 165 and sub-menu items 175) may be respectively associated with functions 240. The portions of indices 200 in data tables 185 may be associated with state data 235. According to some embodiments, one or more functions 240 use state data 235 for function operations.

The following example HTML code includes an example menu 160 identified by the text "menuList." Menu module 180 may be configured to analyze HTML code, such as the following example HTML code, to identify menu items 165 and sub-menu items 170 in the menuList according to one embodiment. Menu items 165 include a menu item called "file" and a menu item called "edit," which may be at a top level of example menu 160. File menu item 165 includes two sub-menu items 170 called "newFile" and "openFile." Edit menu item 165 also includes two sub-menu items 170 called "undo" and "redo." Example menu 160 is an example of a nested menu where sub-menu items 170 are accessed by first accessing menu items 165. The bracketed information in the menuList following "file," "newFile," "openFile," "edit," "undo," and "redo" are state data 235 for these menu items 165. The example HTML code includes "menuItemSelectionOperationMap" code that identifies functions 240 for the sub-menu items: newFile, openFile, "edit," "undo," and "redo" In the menuItemSelectionOperationMap code the names of function 240 for the sub-menu items: newFile, openFile, "edit," "undo," and "redo" have the same names as the sub-menu items, namely newFile, openFile, "edit," "undo," and "redo." While the follow example code is example HTLM code, menu module 180 is not limited to analyzing HTML code.

```
menuList : {
    writable: true,
    value : { "file" : {"displayText_default" : "File",
            "hasSubMenu" : true,
            "menuHeader": true,
            "hasIcon" : false,
            "enabled": true,
            "subMenuItems": ["newFile", "openFile"],
            "subMenuCheckColumn": false
        },
        "newFile":{"displayText_default" : "New File",
            "hasSubMenu" : false,
            "hasIcon" : false,
            "enabled": true
        },
        "openFile" : {"displayText_default" : "Open...",
            "hasSubMenu" : false,
            "hasIcon" : false,
            "enabled": true
        },
    "edit" : { "displayText_default" : "Edit",
            "hasSubMenu" : true,
            "menuHeader": true,
            "hasIcon" : false,
            "enabled": true,
            "subMenuItems": ["undo", "redo "],
            "subMenuCheckColumn": false
        },
        "undo" : { "displayText_default" : "Undo",
            "hasSubMenu" : false,
            "hasIcon" : false,
            "enabled": true
        },
        "redo" : { "displayText_default" : "Redo",
            "hasSubMenu" : false,
            "hasIcon" : false,
            "enabled": true
        }
    }
menuItemSelectionOperationMap : {
    writable: true,
    value: {
        "newFile": function( ){ //new file operation },
        "openFile": function( ){ //open file operation },
        "undo": function( ){ //undo operation },
        "redo": function( ){ //redo operation }
    }
```

Figure 5:
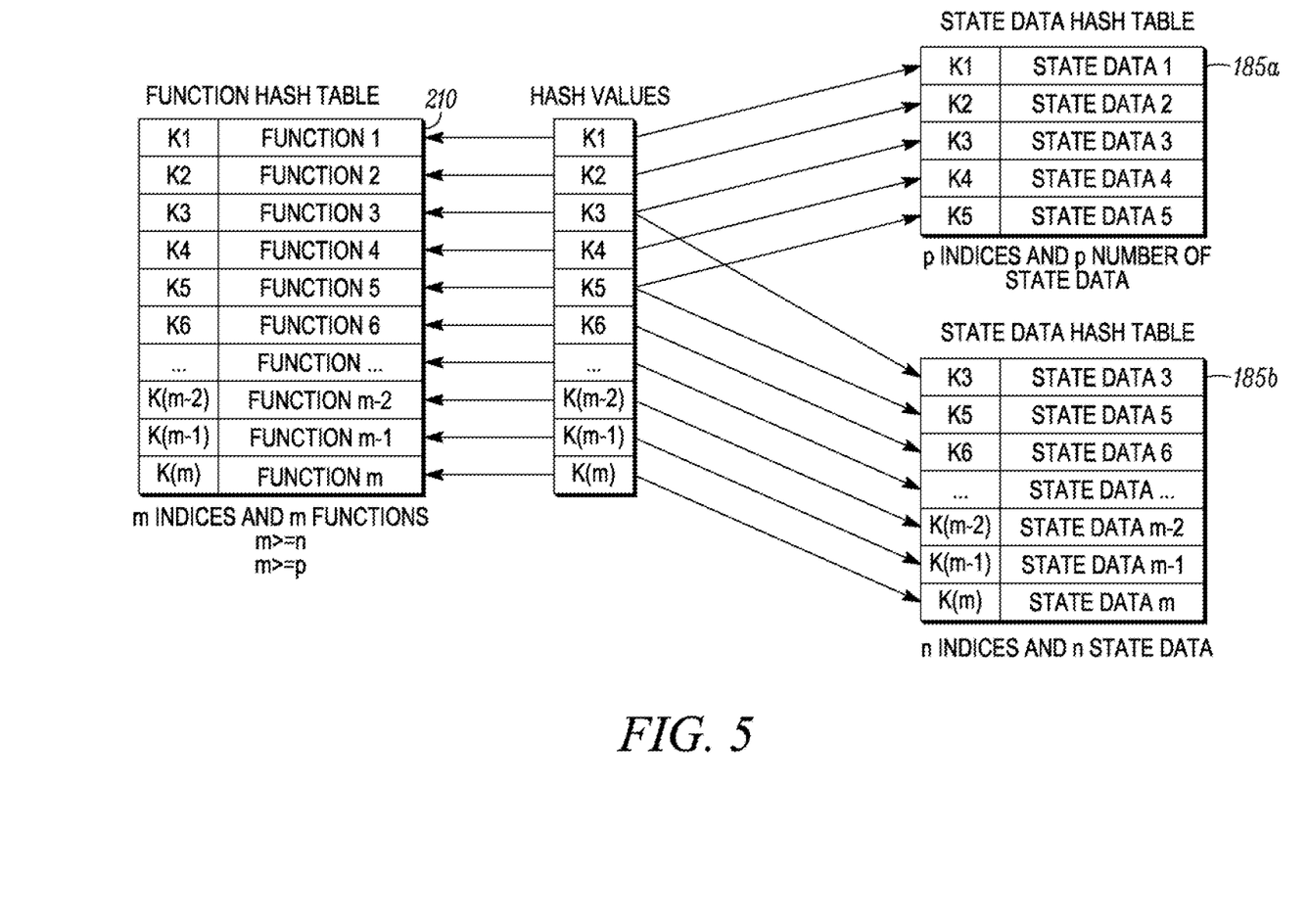
FIG. 5 depicts an example function table and two example data tables according to one example embodiment.

FIG. 5 depicts an example function table 210 and two examples data tables 185a and 185b according to one embodiment. In the example embodiment of FIG. 5, function table 210 includes all indices 200 from K1 to Km and includes all functions 240 from K1 to Km where the indices are respectively associated with the function. Further, data table 185a includes a portion of indices 200 from K1 to K5 and includes state data 235 from K1 to K5 where the indices of the portion of indices are associated with the portions of the state data. Further, data table 185b includes another portion of indices 200 from K5 to Km and K3 and includes state data 235 from K5 to Km and K3 where the indices of the portion of indices are associated with the portions of the state data. In the example embodiment, data tables 185a and 185b include a number of the same indices and state data, which is referred to herein as an overlapping indices and an overlapping state data. While FIG. 5 depicts data tables 185a and 185b with overlapping indices 200 and state data 235, according to alternative embodiments, data tables 185 do not include overlapping indices and state data.

Particular embodiments separate state data 235 and functions 240 in data tables 185 and function table 210 respectively, where data tables 185 and function table 185 are non-hierarchical tables (sometime referred to as flat tables). The non-hierarchical structure of data tables 185 and function table 210 provides that indices for menu items 165 and indices of sub-menu item 170 may be accessed independently of each other. Specifically, an index for a selected sub-menu item 170 may be looked up independently of a look up of an index of a particulate menu item 165, which is associated with the selected sub-menu item. The non-hierarchical structure provides that sub-menu items 170 may be looked up in data tables 185 and function table 185 (non-hierarchical tables) relatively quickly because higher level menu items 160 do not need to be accessed or otherwise traversed for lookup of the sub-menu items. Note that the example HTML code described above for example menu 160 has a hierarchical (i.e., a nested structure) structure where access to sub-menu items 170 are accessed in combination with access to menu items 160 for the sub-menu items, which provides for relatively slow look up of sub-menu items 170 due to the access via menu items 160. Further, separating state data 235 and functions 240 in data tables 185 and function table 185, respectively, provides that menu 160 may be relatively easily customized for users having different use rights. That custom menu information is carried in each data table 185 where data tables 185 may be relatively small and provide for relatively simple and fast analysis of the computing devices for customizing menus 160 on the computing devices. That is, computing devices 110 may quickly analyze flat data tables 185 for relatively quick and simple generation of customized menus 160 based on use rights 195.

Figure 6:
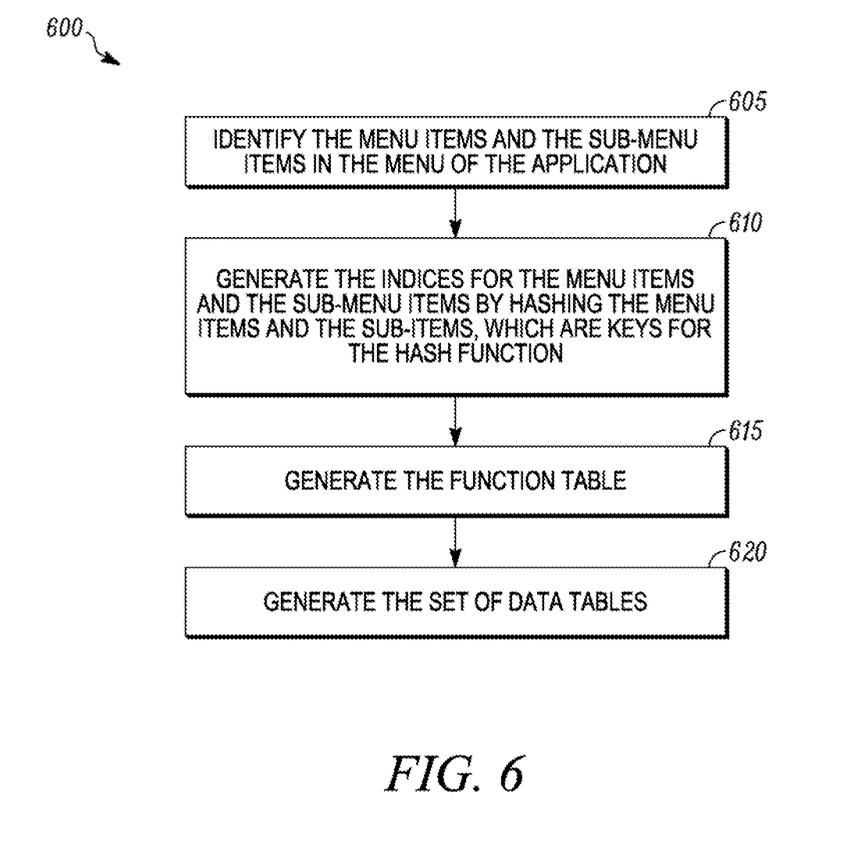
FIG. 6 depicts a high-level flow diagram of a method for generating the function table and generating at least one data table according to one embodiment.

FIG. 6 depicts a high-level flow diagram of a method 600 for generating function table 210 and generating at least one data table 185 according to one embodiment. The high-level flow diagram represent an example embodiment and those of skill in the art will understand that various steps of high-level flow diagram 600 may be combined and/or added without deviating from the scope and the purview of the embodiment.

At 605, menu items 165 and sub-menu items 170 in menu 160 of application 145 are identified. Each menu item 165 is associated with one of functions 240, and each sub-menu item 170 is associated with state data 235.

At 610, indices 200 for menu items 165 and sub-menu items 170 are generated. Indices 200 may be generated by hashing menu items 165 and sub-menu items 170 where indices 200 are identifiers for the menu items and the sub-menu items. While the foregoing described identifying and hashing menu items 165 and sub-menu items 170, according to an alternative embodiment, identifiers for menu items 165 and sub-menu items 170 may be identified for application 145 and hashed to generate indices 200. Identifiers for menu items 165 and sub-menu items may include DOM identifiers.

At 615, application server 105 generates function table 210, which includes indices 200 and functions 240. Indices 200 in function table 210 respectively correspond to functions 240.

At 620, application server 105 generates a set of data tables 185. Each data table 185 includes a portion of indices 200, which are included in function table 210. The portion of indices 200 in each data table 185 defines a subset of menu items 165 or a sub-set of sub-menu items 170. Each computing device 110 receiving one of data tables 185 may use the portion of indices 200 to generate a menu (sometimes referred to as a sub-menu) for application 145 where the menu includes the subset of menu items 165 or a subset of sub-menu items 170, which are defined by the portion of indices 200, which are included in the one of the data tables 185. For example, both example data tables 185a and 185b shown in FIG. 5 include a portion of indices 200 where the indices represent portions of sub-menu items 170. A menu generated, by a one of computing devices 110, from data table 185a may include the particular subset of sub-menu items 175 represented by the portion of indices 200 included in data table 185*a*. Similarly, a menu generated, by a different computing device 110, from data table 185*b* may include the particular subset of sub-menu items 170 represented by the portion of indices 200 included in data table 185*b*. FIG. 3 depicts menus generated by different computing devices 110 and having different sub-menu items 170 where the menus may be generated from different data tables 185 received by the computing devices from application server 105. As described above, generated data tables 185 may be respectively provided to computing devices 110 based on use rights 195. As further described above, each computing device 110 may receive a copy of function table 210. Data tables 185 and function table 210 may be provided to computing devices 110 when the computing devices receive copies of application 145 from application server 105, for example.

When a menu generated by one of computing devices 110 is displayed, and when one of menu items 165 or one of sub-menu items 170 in a menu displayed on one of computing devices 110 is selected, a function for the one of the menu items or the one of the sub-menu items is performed for application 145. The function may be determined from a lookup of an index for the one of the menu items 165 or the one of the sub-menu items 170 where the lookup is in the copy of function table 210 received by the one of the computing devices 110. The index for the one of the menu items 165 or the one of the sub-menu items 170 may be used to determine state data corresponding to the one of the menu items 165 or the one of the sub-menu items 170. The state data may be determined from a lookup of the index for the one of the menu items 165 or the one of the sub-menu items 170 where the lookup is in the particular data table 185 received by the one of the computing devices 110.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments, along with examples of how aspects thereof may be implemented. The above examples and embodiments should not be deemed to be the only embodiments, and are presented to illustrate the flexibility and advantages of the teachings hereof. Based on the above disclosure and the following claims, other arrangements, embodiments, implementations, and equivalents may be employed without departing from the scope hereof, as defined by the claims.

I claim:

1. A method for supporting versions of a menu for an application, the method comprising:
    identifying menu items for the application, wherein the menu items are in a first menu, and the menu items have state data being used by functions to perform operations for the menu items;
    generating indices from the menu items by hashing information associated with the menu items, wherein the indices identify the menu items;
    generating, by a first computing device, a first hash table that includes the indices and the functions, wherein the indices in the first hash table correspond to the functions;
    generating, by the first computing device, a second hash table that includes a first portion of the indices included in the first hash table, the first portion defining a subset of menu items for a second menu and the first portion is less than the entirety of the indices, wherein:
        the first portion of the indices corresponds to a portion of the state data, and
        when an operation for a menu item in the subset of menu items is performed, an index for the menu item in the subset of menu items is used to determine state data corresponding to the index in the second hash table and the index is used to determine a function corresponding to the index in the first hash table;
    generating, by the first computing device, a third hash table, which includes a second portion of the indices included in the first hash table, the second portion defining a second subset of the menu items for a third menu, wherein the second portion of the indices differs from the first portion of the indices by one or more indices, and the second portion is less than the entirety of the indices; and
    providing the second hash table for the second menu to a second computing device of a first user based on use rights of the first user; and providing the third hash table for the third menu to a third computing device of a second user based on use rights of the second user.

2. The method of claim 1, wherein the menu items include a set of a set of sub-menu items.

3. The method of claim 1, wherein the first menu and the second menu are based on use rights of the application for users.

4. The method of claim 3, further comprising assigning the first portion of the indices to the second menu based on the use rights of one of the users.

5. The method of claim 3, wherein the use rights are based on licenses of the users for the application.

6. The method of claim 1, further comprising retrieving the use rights of each user to determine whether to provide the second table or the third table to the second computing device or the third computing device.

7. The method of claim 1, wherein the menu items are document object model (DOM) identifiers in the document.

8. A first computing device for supporting versions of a menu, the computing device comprising:
    a processor for executing instructions; and
    a non-transitory computer-readable storage medium comprising stored instructions, that when executed, control the processor configured for:
        identifying menu items for the application, wherein the menu items are in a first menu, and the menu items have state data being used by functions to perform operations for the menu items;
        generating indices from the menu items, wherein:
            the indices identify the menu items, and
            generating the indices includes hashing information associated with the menu items;
        generating a first hash table that includes the indices and the functions, wherein the indices in the first hash table correspond to the functions;
        generating a second hash table including a first portion of the indices included in the first hash table, the first portion defining a subset of menu items for a second menu and the first portion is less than the entirety of the indices, wherein:
            the first portion of the indices corresponds to a portion of the state data, and
            when an operation for a menu item in the subset of menu items is performed, an index for the menu item in the subset of menu items is used to determine state data corresponding to the index in the second hash table and the index is used to determine a function corresponding to the index in the first hash table;

generating, by the first computing device, a third hash table, which includes a second portion of the indices included in the first hash table, the second portion defining a second subset of the menu items for a third menu, wherein the second portion of the indices differs from the first portion of the indices by one or more indices and the second portion is less than the entirety of the indices; and providing the second hash table for the second menu to a second computing device of a first user based on use rights of the first user; and providing the third hash table for the third menu to a third computing device of a second user based on use rights of the second user.

9. The computing device of claim 8, further configured for retrieving the use rights of each user to determine whether to provide the second table or the third table to the second computing device or the third computing device.

10. The computing device of claim 9, wherein the menu items include a set of sub-menu items.

11. A non-transitory computer-readable storage medium comprising instructions for supporting versions of a menu, wherein the instructions, when executed, are for controlling a computer system configured for:

identifying menu items for the application, wherein the menu items are in a first menu, and the menu items have state data being used by functions to perform operations for the menu items;

generating indices from the menu items, wherein:
the indices identify the menu items, and
generating the indices includes hashing information associated with the menu items;

generating a first hash table that includes the indices and the functions, wherein the indices in the first hash table correspond to the functions;

generating a second hash table including a first portion of the indices included in the first hash table, the first portion defining a subset of menu items for a second menu and the first portion is less than the entirety of the indices, wherein:
the first portion of the indices corresponds to a portion of the state data, and
when an operation for a menu item in the subset of menu items is performed, an index for the menu item in the subset of menu items is used to determine state data corresponding to the index in the second hash table and the index is used to determine a function corresponding to the index in the first hash table;

generating a third hash table, which includes a second portion of the indices included in the first hash table, the second portion defining a second subset of the menu items for a third menu, wherein the second portion of the indices differs from the first portion of the indices by one or more indices and the second portion is less than the entirety of the indices; and providing the second hash table for the second menu to a first computing device of a first user based on use rights of the first user; and providing the third hash table for the third menu to a second computing device of a second user based on use rights of the second user.

* * * * *